United States Patent [19]

Dagard et al.

[11] Patent Number: 4,732,673

[45] Date of Patent: Mar. 22, 1988

[54] DEVICE FOR THE ULTRAFILTRATION OF A PRESSURIZED HIGH-TEMPERATURE LIQUID

[75] Inventors: Philippe Dagard, Marly Le Roi; Jacques Riviere, Colombes, both of France

[73] Assignee: Framatome, Courbevoie, France

[21] Appl. No.: 867,985

[22] Filed: May 29, 1986

[30] Foreign Application Priority Data

May 29, 1985 [FR] France ............................. 85 08054

[51] Int. Cl.$^4$ ............................................. B01D 13/00
[52] U.S. Cl. ................................. 210/247; 210/323.2; 210/456; 210/321.78; 210/321.79; 55/158; 422/48
[58] Field of Search .................. 210/247, 323.2, 433.2, 210/456; 55/158; 422/48

[56] References Cited

U.S. PATENT DOCUMENTS

| | | | |
|---|---|---|---|
| 3,774,771 | 11/1973 | Manjikian et al. | 210/321.1 |
| 4,038,190 | 7/1977 | Bauder et al. | 210/433.2 |
| 4,400,276 | 8/1983 | Bollinger et al. | 210/323.2 |
| 4,461,707 | 7/1984 | Thayer et al. | |

FOREIGN PATENT DOCUMENTS 2228518 6/1974 France .
2407012 5/1979 France .
2552419 3/1985 France .

*Primary Examiner*—Richard V. Fisher
*Assistant Examiner*—Jeffrey W. Peterson
*Attorney, Agent, or Firm*—Pollock, Vande Sande & Priddy

[57] ABSTRACT

Device for the ultrafiltration of a pressurized high-temperature liquid, having, inside a pressure resistant casing (1), a second casing (11) to which are fastened tube plates (15,16) carrying tubes (14) forming an ultrafiltration wall, and a first set of partitions inside the second casing (11) for channelling the flow of the filtrate. A second set of partitions (27) arranged in the casing (11) above the upper tube plate (16) and partitions placed in the casing (1) underneath the lower tube plate (15) make it possible to channel the fluid to be purified and the concentrate. The part of the filter which incorporates the tubes (14) can easily be removed. The fluid circulates at a constant rate in all parts of the filter.

6 Claims, 5 Drawing Figures

DEVICE FOR THE ULTRAFILTRATION OF A PRESSURIZED HIGH-TEMPERATURE LIQUID

FIELD OF THE INVENTION

The invention relates to a device for the ultra-filtration of a pressurized high-temperature liquid, and particularly to a device for purifying the primary fluid of a pressurized-water nuclear reactor by means of hot ultrafiltration.

BACKGROUND OF THE INVENTION

Such reactors have a primary circuit in which the pressurized water for cooling the fuel assemblies of the reactor core circulates. The primary circuit communicates with the internal volume of the vessel containing the core and incorporates primary fluid circulating pumps, steam generators and a pressurizer, which are connected by means of large-diameter pressure-resistant pipes. The primary fluid of the reactor can likewise be circulated in certain auxiliary circuits, allowing it to be treated and its physical or chemical characteristics to be modified.

During its circulation in the primary circuit or in the auxiliary circuits, the cooling fluid comes in contact with many components, most of which are made of or covered with a nickel alloy making it possible to limit the extent to which they are attacked by the primary fluid. However, some components, such as the seats of valves and of cocks, or even some portions of piping, experience a certain wear, with the result that the primary fluid becomes laden with particles of very small dimensions which are torn off from these components. These particles tend to circulate with the primary fluid and therefore pass through the reactor core, where they are subjected to intense neutron bombardment, the effect of which is to activate them. In particular, wear-resistant alloys containing a certain proportion of cobalt cause highly activated particles to occur.

These particles accumulate in certain parts of the components of the reactor, thus presenting problems which are very difficult to solve during reactor maintenance operations, because these operations require preliminary decontamination phases which are very difficult to carry out.

On the other hand, the make-up water and the additives introduced into the primary fluid by means of an auxiliary circuit, such as the volumetric and chemical monitoring circuit, likewise contain solid particles of various origins which are activated when the primary fluid passes through the reactor core.

It is therefore necessary to treat the primary fluid periodically or continuously to reduce the content of activated or activatable particles in this primary fluid. These particles have a mean diameter of 0.5 microns with a considerable proportion of particles with a diameter of the order of 0.1 microns. These particles can also occur in colloidal form, i.e., in the form of a noncrystallized gel.

It is consequently necessary to purify the fluid by means of a process, such as ultrafiltration, more particularly by means of hot ultrafiltration, since the solubility of the pollutant products is greater when cold than when hot.

The idea was therefore to use hot-ultrafiltration processes on the primary fluid at its temperature and operating pressure in the reactor, to ensure its purification during the working of the reactor. Such a process is disclosed in French Pat. No. 2,552,419, which also discloses an ultrafiltration device which can be inserted in the circulation of the primary fluid inside the containment shell of the reactor. Such an ultrafiltration device, through which a fluid flows at a temperature in the neighborhood of 300° and at a pressure of the order of $155.10^5$ Pa, has a pressure-resistant casing of very great thickness, made of a material resistant to the corrosive action of the primary fluid and its additives. The ultrafiltration wall consists of an assembly of composite tubes formed when homogeneous porous materials are superimposed on one another. One of the layers produced in microporous form serves as a separating membrane for the ultrafilter, the other layers constituting the support for the microporous layer. The tubes are fastened at each of their ends to a tube plate, the tube plates themselves being fastened to the inside of the casing. One of these tube plates corresponding to the inlet end of the tubes defines, together with the wall of the casing, an inflow chamber for the fluid to be purified, into which opens the pipe supplying this fluid. A filtrate recovery pipe opens into the casing between the two tube plates, and a concentrate discharge pipe is put into communication with the part of the casing receiving the concentrate, located between the tube-outlet tube plate and the end of the casing opposite the inflow chamber. The concentrate is kept in circulation to prevent the clogging of the ultrafiltration wall. During use over a long period of time, the tubes are liable to become clogged and the microporous layer deposited on the tubes may suffer wear which, in this case, can even go so far as to eliminate it completely. In any device of this type, it is therefore necessary to change the tubes after a certain period of use. In such filters, the tubes, integral with the tube plates which are themselves welded to the walls of the casing, cannot be replaced in a simple way, and it is consequently necessary to replace the filter as a whole when the tubes are clogged or worn.

On the other hand, the structure of the filter is such that, during rapid heat transience, differential expansions occur between the various parts of the filter, and this is detrimental to the mechanical strength of the filter and to ensuring good leak-proofing between the parts of this filter receiving the filtrate and the parts receiving the concentrate.

Finally, the volume of liquid circulating in the tubes decreases during filtration, because the filtrate passes through the wall of the tube, whereas the concentrate of decreasing volume continues to circulate in the tube. The rate of circulation of the fluid therefore tends to drop towards the end of the tubes, and there is consequently a risk of clogging towards the outlet end of the tubes.

SUMMARY OF THE INVENTION

The object of the invention is, therefore, to propose a device for the ultrafiltration of a pressurized high-temperature liquid, having a pressure-resistant casing containing an assembly of tubes which form the ultrafiltration wall and which are fastened in a first tube plate, at one of their ends constituting the inlet end for the liquid to be filtered, and in a second tube plate, at their other end, and a chamber delimited by the first tube plate and the casing, into which opens an inflow pipe for the liquid to be filtered, a filtrate discharge pipe and a concentrate discharge pipe likewise opening into the casing, and this ultrafiltration device is intended to make it possible to replace easily the tubes forming the filtration wall, prevent differential expansions between the elements of the filter during its operation and obtain very high filtration efficiency, without any clogging of the ultrafiltration wall, preferably in certain zones of this wall.

To achieve this object, the ultrafiltration device also incorporates, inside the pressure-resistant casing, or first casing, consisting of two separable parts, a removable filtration assembly consisting of:

a second casing which is placed inside the first casing so as to form a continuous space between its outer wall and the inner wall of the first casing and on which the tube plates are fastened transversely so as to delimit, on the inside of the second casing, a filtration chamber which contains the tubes and which is located between the two tube plates and a distribution chamber downstream of the filtration chamber in the direction of the tube outlet, a first set of partitions which are fastened to the inside of the second casing in the filtration chamber and which delimit filtrate circulation compartments extending continuously in the direction of the tubes between the two tube plates, the partitions of this first set possessing orifices at one of their ends, so that each of the compartments communicates with two adjacent compartments at its end adjacent to the first plate or at its end adjacent to the second plate, respectively, with the exception of one of the compartments which communicates with a single adjacent compartment and of one other compartment which communicates with a single adjacent compartment and with the space which is contained between the two casings and into which opens the filtrate discharge pipe, and a second set of partitions which are fastened on the inside of the concentrate distribution chamber and which delimit compartments, each communicating with the outlet ends of an assembly of tubes, and the inflow chamber for the liquid to be filtered also contains a partition delimiting compartments which each communicate with the inlet ends of an assembly of tubes, the assemblies of tubes communicating with the compartments of the distribution chamber and with the compartments of the inflow chamber respectively being selected so that a circulation with a constant flow of liquid is established in the tubes, in one direction or the other, between the inflow chamber and the distribution chamber, one of the compartments of the inflow chamber communicating with the concentrate discharge pipe.

BRIEF DESCRIPTION OF THE DRAWINGS

In order that the invention may be more clearly understood, an embodiment of an ultrafiltration device according to the invention, which can be used to purify the pressurized cooling water of a nuclear reactor, will now be described with reference to the attached drawings, in which.

DESCRIPTION OF PREFERRED EMBODIMENT

Figure 1:
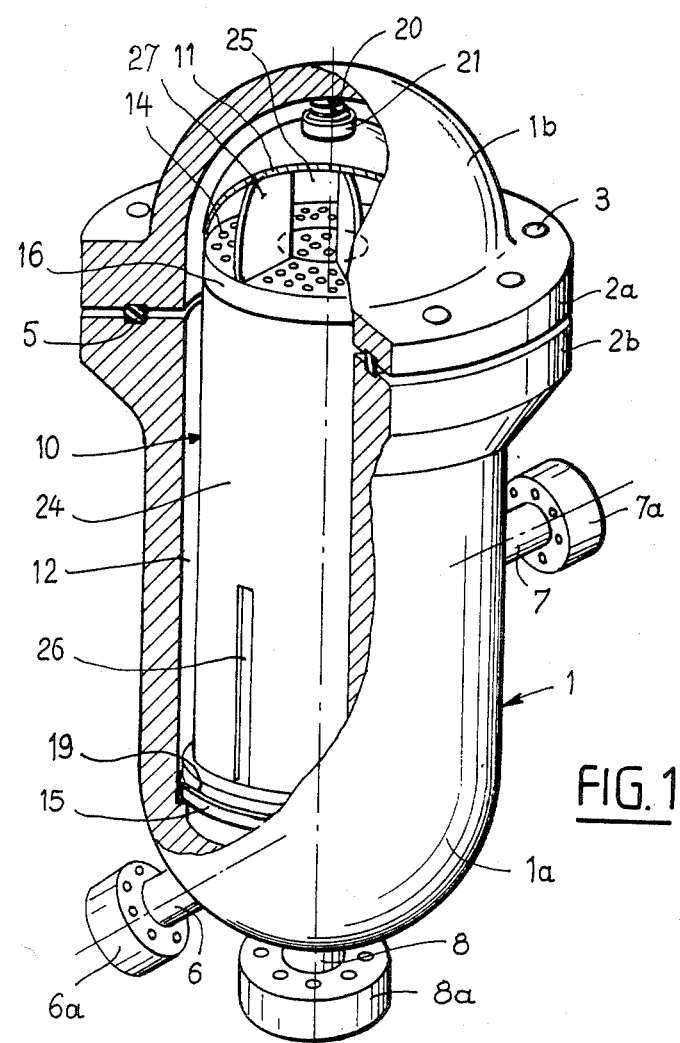
FIG. 1 is partially section perspective view of a filtration device according to the invention.

FIG. 1 shows the pressure-resistant outer casing 1 of an ultrafiltration device according to the invention. This outer casing of great thickness is intended to withstand the pressure of the primary fluid of a nuclear reactor and has a general cylindrical shape with a rounded bottom. This casing 1 consists of two parts 1a and 1b which are joined to one another by means of two flanges of great thickness 2a and 2b joined together by screws engaged in holes 3 aligned with one another in the flanges 2a and 2b. To ensure the leak-proofing and pressure resistance of the casing 1 of the ultrafilter, a gasket 5 is inserted between the flanges 2a and 2b. Clamping as result of the tightening of the screws engaged in the holes 3 makes it possible to achieve perfect leak-proofing of the cover 1b in relation to the body 1a of the casing of the filter. Three connection pieces 6, 7 and 8 passing through the body 1a of the outer casing 1 of the filter and provided with respective connecting flanges 6a, 7a and 8a make it possible to connect the ultrafilter to a pipe supplying water to be purified, to a filtrate discharge pipe and to a concentrate discharge pipe, respectively.

An ultrafiltration assembly designated as whole by the reference numeral 10 is arranged inside the casing 1.

This ultrafiltration assembly 10 is contained completely within a casing 11 of cylindrical shape, which is closed by a rounded bottom and which constitutes the second casing of the filter 1. This second casing 11 is placed inside the outer casing 1 in such a way that a continuous space 12 is provided between the outer surface of the casing 11 and the inner surface of the casing 1. The casing 11 contains an assembly of straight tubes 14 which are fastened at one of their ends, or inlet end, in a tube plate 15 and at their other end, or outlet end, in a tube plate 16. The designations "inlet" or "outlet" for the ends of the tubes are without prejudice to the direction of circulation of the liquid at these ends in the subsequent description.

The tube plates 15 and 16 are fastened transversely relative to the second casing 11 at the ends of its cylindrical part.

Figure 2:
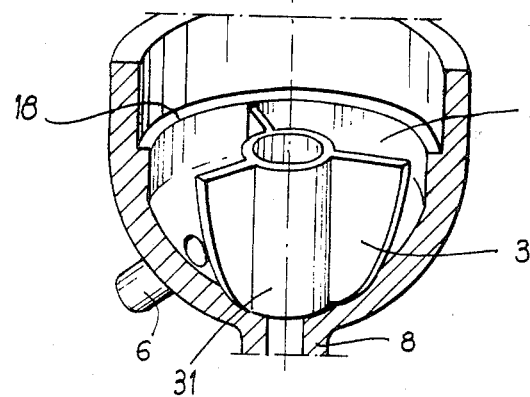
FIG. 2 is a sectioned perspective view of the inflow chamber for the liquid to be purified in the filter.

Referring to FIG. 2, it can be seen that the inner surface of the casing 1 of great thickness is machined to form a bearing surface 18. A groove is machined on the tube plate 15 in its outer lateral part, to receive a gasket 19 which ensures perfect leak-proofing between the filtrate and the concentrate. When the ultrafiltration assembly 10 is placed inside the casing 1, as can be seen in FIG. 1, this assembly rests on the bearing surface 18 via the tube plate 15, thus ensuring that it is supported perfectly inside the casing 1; in this position, a continuous space 12 is provided between the casings 11 and 1. The assembly 10 can be introduced into the casing 1 by means of its upper part, when the cover 1b is removed. A bearing piece 21 located at the top of the rounded end of the casing 11 and a spring 20 of great stiffness ensure that the casing 11 is secured inside the casing 1, when the cover 1b is fitted and clamped on the body 1a. The bearing surfaces and the spring 20 alone ensure that the assembly 10 is fastened removably in the pressure-resistant first casing 1.

The transverse tube plates delimit within the casing 11 a filtration chamber 24 of cylindrical shape, located between the two tube plates 15 and 16 and containing the tubes 14, and an upper distribution chamber 25 of hemispherical shape, located between the tube plate 16 and the upper hemispherical wall of the casing 11.

The filtration chamber 24 communicates with the space 12 between the casings via an elongated orifice 26 passing through the cylindrical wall of the casing 11.

The distribution chamber 25 contains a partitioning 27 which will be described in more detail later in the text.

As can be seen in FIG. 2, the lower part of the casing 1 underneath the plate 15 constitutes an inflow chamber 28, for the fluid to be purified, into which opens the fluid-supply connection piece 6. The inflow chamber 28 contains a partitioning 30 which delimits in this inflow chamber 28, three peripheral compartments 28a, 28b and 28c and a central compartment 28d, into which opens the filtratedischarge connection piece 8. When the assembly 10 is in position in the casing 1, as shown in FIG. 1, the tube plate 15 comes to rest on the upper part of the partitioning 30 and on the bearing surface 18 which are both equipped with leak-proofing means (not shown) ensuring leak-proofing of the sectors 28a, 28b and 28c relative to one another.

The tubes 14 are straight tubes made of sintered metal and covered on the inside with a thin microporous ceramic layer forming the ultrafiltration layer. The inner walls of the tubes thus constitute as a whole the ultrafiltration wall of the device. However, the ends of the tubes engaged and expanded in the tube plates are not coated with microporous ceramic. These ends can likewise consist of metal sleeves attached to the ends of the sintered-metal tubes.

The principle of ultrafiltration is well known. The fluid to be purified is introduced into the tubes, where it comes in contact with the ultrafiltration wall, and some of the fluid passes through the wall, at the same time separating from its impurities to constitute the filtrate, the rest of the fluid continuing to circulate in the tubes to constitute the concentrate, the impurity content of which increases during the circulation of the fluid.

Figure 3A:
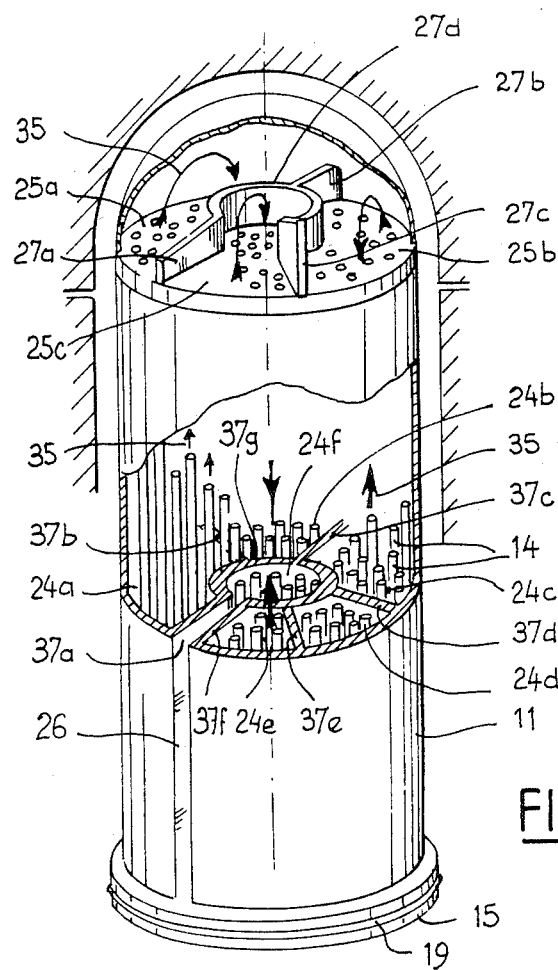
FIG. 3a is a partially sectioned perspective view of the upper part of the ultrafiltration device, showing the circulation of the concentrate in this part of the device.
Figure 3B:
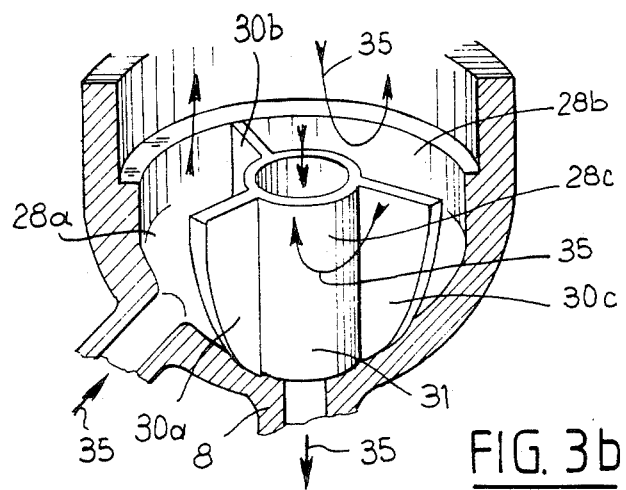
FIG. 3b is a sectioned perspective view of the lower part of the ultrafiltration device, showing the circulation of the concentrate in this part of the device.

FIGS. 3a and 3b show by means of arrows 35 the circulation of the fluid to be purified and of the concentrate inside the tubes 14 in the filtration chamber 24 and outside these tubes 14 in the inflow chamber 28 and in the upper distribution chamber 25. To give a clearer illustration, the partitions 27a, 27b, 27c and 27d of the distribution chamber 25 have been shown only partially, but it is quite clear that these partitions are in their upper part in contact with the inner surface of the rounded end of the casing 11. The radial partitions 27a, 27b and 27c and the partition 27d in the form of a portion of a cylinder are connected to one another so as to form, in the distribution chamber 25, three compartments 25a, 25b and 25c which are completely separate from one another and which each communicates with the outlet ends of a particular assembly of tubes 14.

The partitioning 30 of the inflow chamber 28 consists of three radial partitions 30a, 30b and 30c connected to a tubular partition 31 arranged axially in the filter. This partitioning thus delimits four separate compartments 28a, 28b, 28c and 28d in the chamber 28. The compartment 28d communicates directly with the concentratedischarge connection piece 8.

The liquid to be purified enters the compartment 28a via the connection piece 6 (arrow 35) and is then distributed in the tubes 14 communicating with this compartment 28a. Some of the fluid is extracted in the form of a filtrate during circulation in the tubes, and the rest constituting the concentrate flows into the compartment 25a of the distribution chamber, since the assembly of tubes, the inlet ends of which communicate with the compartment 28a, have outlet ends opening into the compartment 25a. On the other hand, the inlet ends of other tubes opening into the compartment 25a communicate with the inflow compartment 28b. The concentrate therefore falls again in the corresponding tubes 14 and flows into the chamber 28b. This chamber 28b communicates not only with these tubes, but also with an assembly of tubes, the outlet ends of which open into the compartment 25b. The concentrate rises again in the chamber 25b, into which also open tubes communicating with the compartment 28c of the inflow chamber. Finally, this compartment 28c communicates with tubes which in turn open into the compartment 25c of the distribution chamber 25. This compartment 25c communicates with tubes, the inlet ends of which open into the central compartment 28d which itself communicates with the concentrate discharge pipe. The concentrate thus circulates inside the tubes in one direction or the other, according to the arrows 35, and finally enters the connection piece 8. The concentrate is then either recirculated or discharged and treated.

The arrangement of the partitions 30 and 27 and the dimensions of the compartments 28 and 25 of the inflow chamber, and distribution chamber respectively, are such that the number of tubes used for the successive circulation of the fluid vertically in one direction or the other, decreases so as to take into account the reduction in volume of the fluid resulting from the extraction of filtrate in the filtration chamber 24. An exact calculation makes it possible to determine in terms of quantity the number of tubes opening into each of the compartments, to obtain a practically constant speed of the fluid during its circulation in the tubes of the filter.

It may be noted that there is no need to ensure perfect leak-proofing between the compartments 28a, 28b, 28c and 28d of the chamber 28 or between the compartments 25a, 25b and 25c of the chamber 25, since all these compartments receive concentrate, even though the impurity content of this concentrate differs from one compartment to another. In contrast to this, it is essential to ensure perfect leak-proofing between the concentrate and the filtrate, i.e., between the zone 24 and the zone 28, this being achieved by means of the gasket 19.

Figure 4:
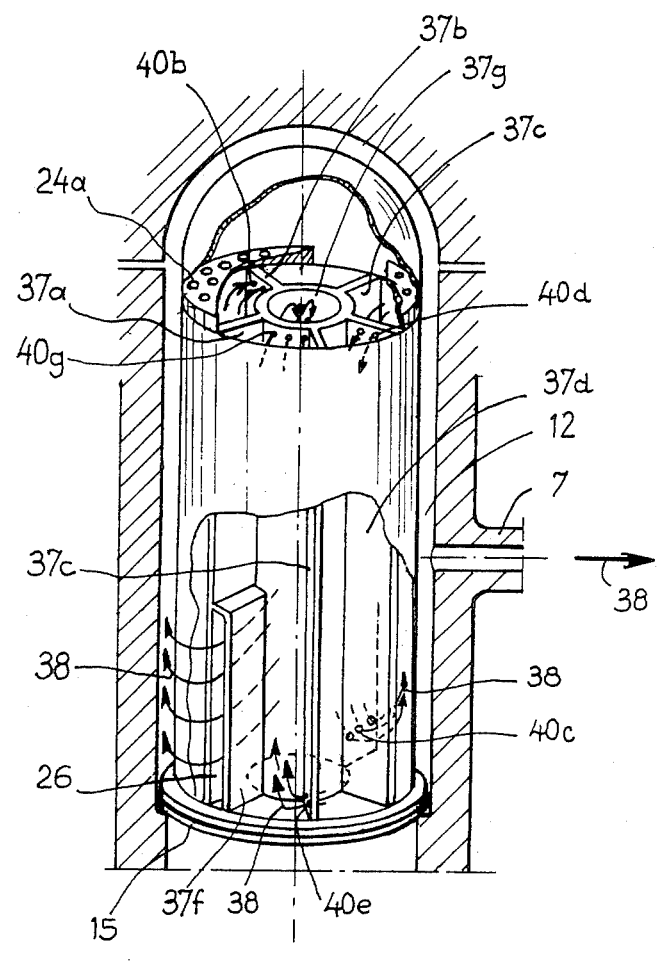
FIG. 4 is a sectioned perspective view of the upper part of the filtration device, showing the circulation of the filtrate inside this part of the device.

Referring to FIGS. 3a and 4, it will be seen that the filtration chamber 24 is separated into six compartments 24a to 24f by radial partitions 37a to 37f and by a central partition in the form of a portion of a cylinder 37g.

The central compartment 24f communicates directly via the space provided between the partitions 37a and 37f with the orifice 26 passing through the casing 11, to put this compartment 24f in communication with the space 12 and the filtrate-discharge connection piece 7.

FIG. 4 shows the circulation of the filtrate in the various compartments of the filtration chamber 24, as indicated by the arrows 38.

The compartment 24a, which is the first compartment into which the fluid to be purified passes, receives the filtrate into its internal volume and communicates with the adjacent compartment 24b via orifices 40b located in the upper part of the partition 37b. The compartments 24b, 24c, 24d and 24e each communicate with two adjacent compartments via corresponding orifices 40 arranged successively in the upper part and the lower part of the wall 37 separating the compartment and the adjacent compartments. Thus, the orifices 40c and 40e are located in the lower part of the walls 37d and 37f, and the orifices 40b, 40d and 40g are located in the upper part of the walls 37b, 37d and 37g, respectively.

The last compartment 24f communicates only with the adjacent compartment 24e and with the space 12 between the casings via the space provided between the partitions 37a and 37f and the elongate orifice 26 located in the wall of the casing 11. This results in a circulation of the filtrate in the direction of the arrows 38 over the length of the compartments 24a to 24f, in one direction or the other, between the tube plates 15 and 16, without areas of dead-water being generated in the gap 12.

The orifices 40 provided either in the lower part, in the vicinity of the tube plate 15, or in the upper part, in the vicinity of the upper tube plate 16, of the separating partitions 37 are such that they make it possible to produce a pressure drop in the circulating filtrate which is equivalent to the pressure drop experienced by the concentrate in the tubes 14. The pressure differences on either side of the walls of the tubes are cancelled out in this way.

On the other hand, the filtrate coming from the compartment 24f and filling the space 12 makes it possible to balance the pressure on either side of the casing 11, as a result of which this casing, which does not undergo any excess pressure, can have a limited thickness. This reduces in proportion the mass of the removable filtration assembly 10.

The separation of the filtrate and the concentrate is achieved in the lower part of the filter by means of the gasket 19 carried by the tube plate 15 bearing on the bearing surface 18 machined on the inner surface of the casing 1, and by means of the partitioning 30.

The main advantages of the device according to the invention are a very high filtration efficiency because of the long distance covered by the fluid through the tubes, in spite of reduced overall size of the ultrafiltration device; a constant rate of circulation of the fluid in the tubes, and a circulation of the filtrate which allows the pressure and temperature to be made uniform in the filtration device as a whole. Furthermore, the removable filtration assembly can easily be extracted from the pressurized casing for the purpose of exchanging or repairing it. It is likewise very easy to reinstall with conventional lifting and handling means.

The invention is not limited to the embodiment described; thus, it is possible to use a different number of partitions and compartments in the inflow chamber, filtration chamber and distribution chamber of the filter, and to use casing shapes different from those described, and these casings and these partitions can be made of any material compatible with the physical and chemical characteristics of the liquid to be treated.

Tubes having a different structure and composition can be used to form the ultrafiltration wall.

Finally, the device can be used not only for purifying the primary fluid of a pressurized-water nuclear reactor, but also for purifying liquids other than water, for example in the chemical industry.

We claim:

1. Device for ultrafiltrating a pressurized high-temperature liquid the temperature and pressure of which are of the order of 300° C. and $155.10^5$ Pa, respectively, having a first, pressure-resistant casing (1) containing an assembly of tubes (14) which form an ultrafiltration wall and which are fastened in a first tube plate (15), at one of their ends constituting an inlet end for a liquid to be filtered, and in a second tube plate (16), at their other end, and a chamber (28) delimited by said first tube plate (15) and said first casing (1), into which opens a pipe (6) supplying said liquid to be filtered, a filtrate discharge pipe (7) and a concentrate discharge pipe (8) likewise opening into said first casing (1), wherein said device comprises, inside said first casing (1), which consists of two separable parts (1a, 1b), a removable filtration assembly (10) consisting of
  (a) a second casing (11) located inside said first casing (1) so as to provide a continuous space (12) between its outer wall and the inner wall of said first casing (1) and on which said tube plates (15, 16) are fastened transversely so as to delimit, inside said second casing (11), a filtration chamber (24) which contains said tubes (14) and which is located between said two tube plates (15, 16) and a distribution chamber (25) downstream of said filtration chamber (24) in the direction of a tube outlet;
  (b) a first set of partitions (37) which are fastened inside said second casing (11) in said filtration chamber (24) and which delimit filtrate circulation compartments (24a, 24b, 24c, 24d, 24e, 24f) extending continuously in the axial direction of said tubes (14) between said two tube plates (15, 16), partitions of this first set having orifices (40) at one of their ends, so that each of said compartments (24a, 24b, 24c, 24d, 24e, 24f) communicates with two adjacent compartments at its end adjacent to said first plate (15) or at its end adjacent to said second plate (16), respectively, with the exception of one (24a) of said compartments which communicates with a single adjacent compartment (24b) and of another compartment (24f) which communicates with a single adjacent compartment (24e) and with a space (12) which is contained between said two casings and into which opens said filtrate discharge pipe (7); and
  (c) a second set of partitions (27) which are fastened on the inside of said concentrate distribution chamber (25) and which delimit compartments (25a, 25b, 25c) each communicating with the ends of a said assembly of tubes (14), an inflow chamber (28) for said liquid to be filtered likewise containing a partitioning (30) fastened to said first casing (1) which delimits compartments (28a, 28b, 28c, 28d) each communicating with the ends of a said assembly of tubes (14), said assemblies of tubes (14) communicating with said compartments of said distribution chamber (25) and with said compartments of said inflow chamber (28) respectively being selected so that a circulation with a constant flow of liquid is established in said tubes (14), in one direction or the other, between said inflow chamber (28) and said distribution chamber (25), one (28d) of said compartments of said inflow chamber (28) communicating with said concentrate discharge pipe (8).

2. Ultrafiltration device according to claim 1, wherein said first and second casings (1; 11) are symmetrical in terms of revolution about a common vertical axis, and the filtration assembly (10) rests on a bearing surface (18) machined on the inner surface of said first casing (1) by means of one of said tube plates (15) located in its lower part and having a groove on its lateral surface, a gasket (19) being positioned in said groove to ensure leak-proofing between the filtrate and the concentrate.

3. Ultrafiltration device according to claim 2, comprising an elastic device (20) between an upper part of said second casing (11) and a corresponding part of an inner surface of said first casing (1), to retain the filtration assembly inside said first casing (1).

4. Ultrafiltration device according to claim 1, wherein said first and second casings (1; 11) are symmetrical in terms of revolution about a common axis, said partitioning (30) inside said inflow chamber (28) comprising a central cylindrical partition (31) coaxial with said first and second casings (1; 11) and delimiting a compartment (28d) of said inflow chamber (28) in communication with said concentrate discharge pipe (8), radial partitions (30a, 30b, 30c) being fastened to said central partition (31) on the outside of the latter.

5. Ultrafiltration device according to claim 4, wherein said partitions (27) of said distribution chamber (25) comprise a cylindrical central partition (27d) coaxial with said first and second casings (1; 11), radial partitions (27a, 27b, 27c) being fastened to said central partition (27d) on the outside of the latter, two of these partitions (27a, 27c) being fastened to said central partition (27d) along the end generating lines of the latter.

6. Ultrafiltration device according to claim 1, wherein said first and second casings (1; 11) are symmetrical in terms of revolution about a common axis, said partitions (37) of said filtration chamber (24) comprising a central cylindrical partition (37g) coaxial with said first and second casings (1; 11) and having an orifice extending over part of its length, and radial partitions (37a, 37b, 37c, 37d, 37e and 37f) fastened to said central partition (37g) along several generating lines and on the outside of the latter, two of these partitions (37a, 37f) being fastened along the edges of said orifice in said central partition (37g), these partitions (37a, 37g) joining this orifice to an orifice (26) passing through a wall of said second casing (11), to allow the filtrate to pass from said compartment (24f) delimited by said partition (37g) to the space (12) located between said first and second casings (1; 11).

* * * * *